United States Patent
Yoshida

(10) Patent No.: US 8,111,321 B2
(45) Date of Patent: Feb. 7, 2012

(54) IMAGING DEVICE AND METHOD FOR ITS IMAGE PROCESSING, WITH FACE REGION AND FOCUS DEGREE INFORMATION

(75) Inventor: Akihiro Yoshida, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 466 days.

(21) Appl. No.: 12/361,256

(22) Filed: Jan. 28, 2009

(65) Prior Publication Data

US 2009/0213239 A1 Aug. 27, 2009

(30) Foreign Application Priority Data

Feb. 5, 2008 (JP) ................................ 2008-024637
Dec. 8, 2008 (JP) ................................ 2008-312262

(51) Int. Cl.
*H04N 5/232* (2006.01)
*H04N 5/222* (2006.01)
(52) U.S. Cl. ................. 348/345; 348/333.02; 348/231.2
(58) Field of Classification Search ............... 348/231.2, 348/347, 345, 349, 350, 352
See application file for complete search history.

(56) References Cited

U.S. PATENT DOCUMENTS

| | | | | |
|---|---|---|---|---|
| 5,307,170 A * | 4/1994 | Itsumi et al. | ................. | 348/219.1 |
| 6,657,661 B1 * | 12/2003 | Cazier | ......................... | 348/231.2 |
| 6,982,750 B1 | 1/2006 | Yoshida et al. | | |
| 6,993,184 B2 * | 1/2006 | Matsugu | ....................... | 382/173 |
| 7,002,625 B2 * | 2/2006 | Takahashi | .................. | 348/231.2 |
| 7,180,543 B2 | 2/2007 | Ojima et al. | | |
| 7,187,409 B2 | 3/2007 | Nakahira et al. | | |
| 7,307,662 B2 | 12/2007 | Yoshida et al. | | |
| 7,397,609 B2 * | 7/2008 | Akiyama et al. | ............... | 359/676 |
| 7,847,839 B2 * | 12/2010 | DeLuca et al. | ................ | 348/241 |
| 7,882,442 B2 * | 2/2011 | Lawther et al. | ............... | 715/748 |
| 2002/0054224 A1 * | 5/2002 | Wasula et al. | ................. | 348/232 |
| 2003/0071908 A1 * | 4/2003 | Sannoh et al. | ................ | 348/345 |
| 2004/0169766 A1 | 9/2004 | Yoshida | | |
| 2006/0061677 A1 | 3/2006 | Yoshida | | |
| 2007/0030369 A1 | 2/2007 | Ojima et al. | | |
| 2007/0212055 A1 | 9/2007 | Yoshida | | |
| 2008/0084487 A1 | 4/2008 | Yoshida | | |
| 2009/0059061 A1 * | 3/2009 | Yu et al. | ........................ | 348/347 |

FOREIGN PATENT DOCUMENTS

| | | |
|---|---|---|
| JP | 2003-075717 | 3/2003 |
| JP | 2003-107335 | 4/2003 |
| JP | 2005-277813 | 10/2005 |
| JP | 2006-227080 | 8/2006 |

* cited by examiner

*Primary Examiner* — Hung Lam
(74) *Attorney, Agent, or Firm* — Dickstein Shapiro LLP

(57) ABSTRACT

An imaging device, such as a camera, may be provided with a focus-shift structure configured to shift a focal position; a solid-state image sensing element configured to convert an optical image of a photographing subject to image data; and an image processing unit including a face region detecting unit and a photographing subject frequency information capturing unit. The detecting unit may be configured to detect a face region from the image data and obtain face region information indicating the detected face region, and wherein the information capturing unit is configured to capture focus degree information indicating a degree of focus for each detected face region. Plural image data, the face region information, and the focus degree information may be stored in the imaging device as a single file.

7 Claims, 13 Drawing Sheets

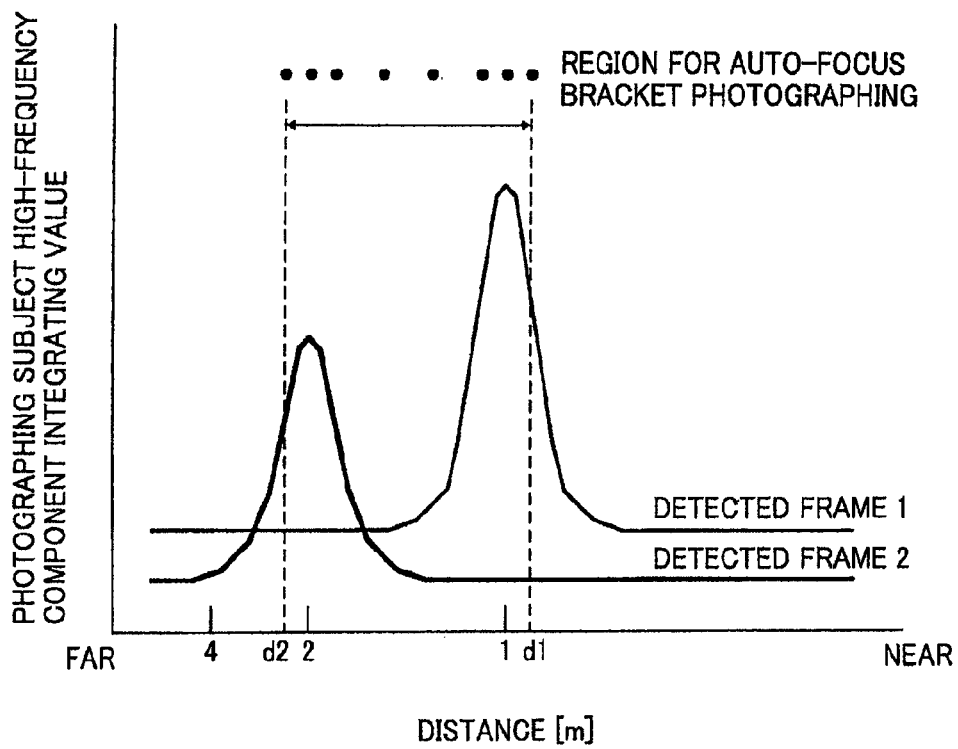
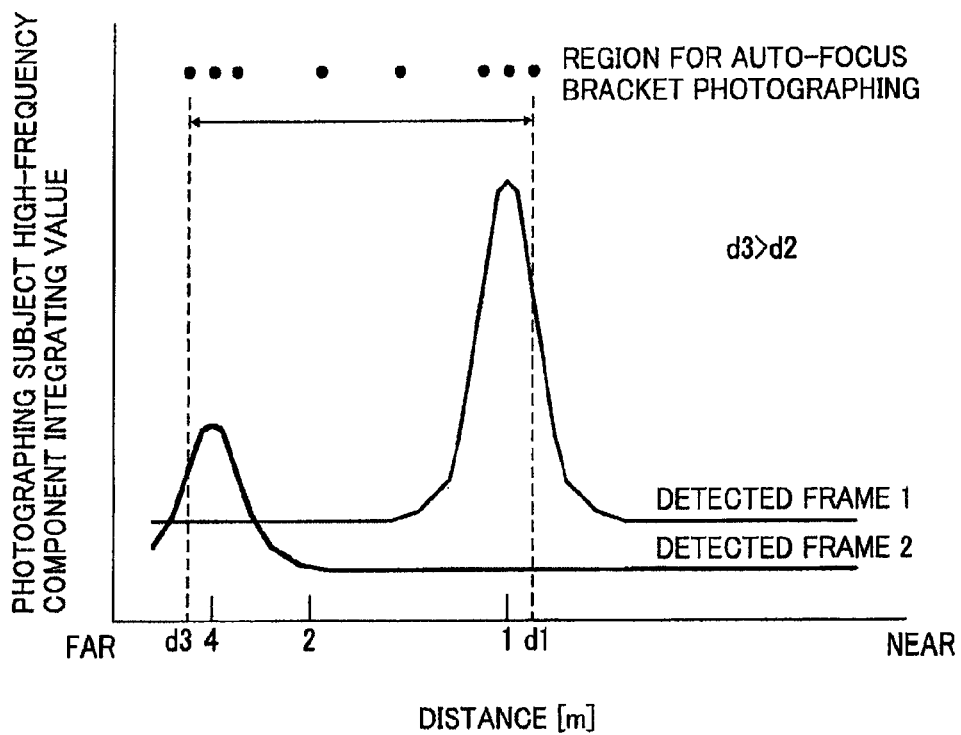

IMAGING DEVICE AND METHOD FOR ITS IMAGE PROCESSING, WITH FACE REGION AND FOCUS DEGREE INFORMATION

BACKGROUND OF THE INVENTION

1. Field of the Invention

The present invention relates to an imaging device, such as a digital still camera, a digital video camera, and the like, and a method of image processing. More particularly, the present invention relates to an imaging device which is capable of obtaining an image focused on a target person's face and an imaging method thereof.

2. Description of the Related Art

There are many scenes where the photographic subject is one or more person(s), and it is important to photograph the person's face clearly. Under this circumstance, a camera implementing a face-recognition function is commercialized by various manufacturers.

The face-recognition function is achieved by a technology that detects a face region, by matching facial patterns, such as eye, nose, mouth or the like. The face-recognition technology is used for optimizing image quality factors of the detected face region so as to obtain an image that contains a clear face. The image quality factors can be a color reproduction of skin, an edge reinforcement, an exposure or the like.

In addition to the above-mentioned image quality factors, a focus function by which the camera can focus on the person's face is also important. But there are many scenes where the conventional auto-focus implemented camera does not focus well on the person's face. For example, there is a scene where it is difficult to focus on a person's face, as desired, because of limitations of the focal algorithm. Especially, this happens where several people to be photographed are at different distances, and a photographing condition where the focus length is on the telephoto side and the focal depth is shallow.

To overcome this problem, Auto-Focus bracket photographing is known. Auto-Focus bracket photographing obtains several images with different focal positions, and then a best focused image is selected among the several photographed images.

Currently, selecting a best focused image is only implemented in PC software. Therefore, a user is forced to confirm each image on a monitor of the PC. Since this technique is difficult and time consuming, it is desired to implement the technique on a camera. But it has limitations to select high quality image, 10 million pixel level image, on a monitor with VGA (Video Graphic Array) size of the camera.

Laid-open Japanese Patent Applications (JP2003-75717, JP2006-337080, JP2003-107335) disclose a combination of a face recognition technology and an auto-focus mechanism.

Japanese Patent Application (JP2005-277813) discloses a combination of Auto-Focus bracket photographing and an image extraction technique.

There is no known camera that is capable of face recognition technology and Auto-Focus bracket photographing and the image extracting technique.

SUMMARY OF THE INVENTION

One of the objects of the present invention is to provide an imaging device that has a first operation input unit configured to receive a photographing instruction from a user, a photographing optical system including a focus-shift structure configured to shift a focal position, a solid-state image sensing element configured to convert an optical image of a photographing subject received from the photographing optical system to an image data, an image processing unit including a face region detecting unit, and a photographing subject frequency information capturing unit, wherein the face region detecting unit is configured to detect a face region from the image data and obtain face region information indicating the detected face region, and wherein the photographing subject frequency information capturing unit is configured to capture focus degree information indicating a degree of focus for each detected face region, a recording unit configured to record a file, a control unit configured to control the first operation input unit, the photographing optical system, the image processing unit, and a recording unit, wherein the control unit obtains a plurality of the image data with different focal positions by controlling the focal position of the photographing optical system in response to the photographing instruction, obtains the face region information and the focus degree information for each image data, and stores the plurality of the image data, the face region information and the focus degree information in the recording unit as a single file.

BRIEF DESCRIPTION OF THE DRAWINGS

FIGS. 9A through 9D are diagrams showing examples to determine a range of auto-focus.

DETAILED DESCRIPTION OF PREFERRED EMBODIMENTS

Figure 1A:
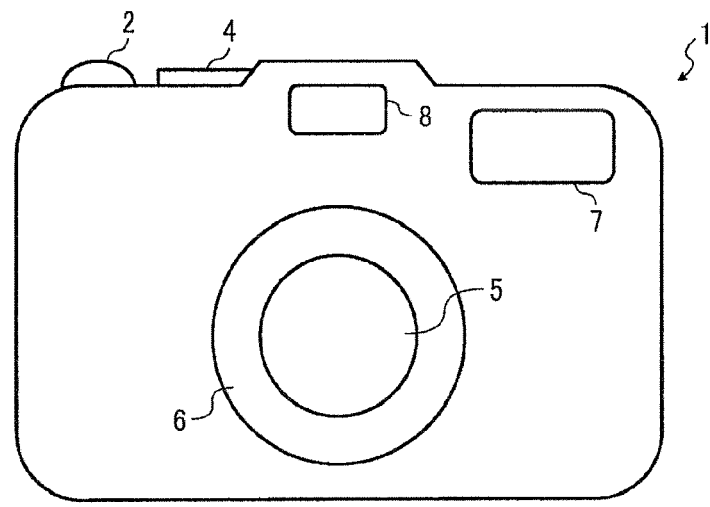
FIGS. 1A to 1C are diagrams showing external appearance structure of an imaging device.
Figure 1B:
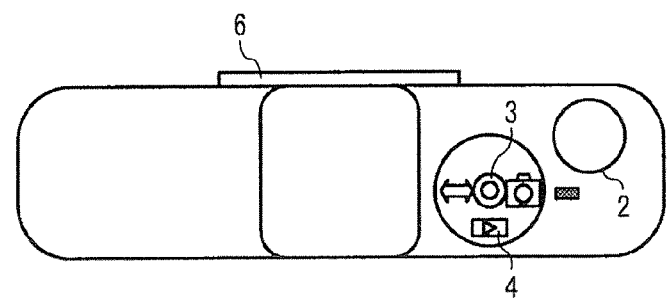
Figure 1C:
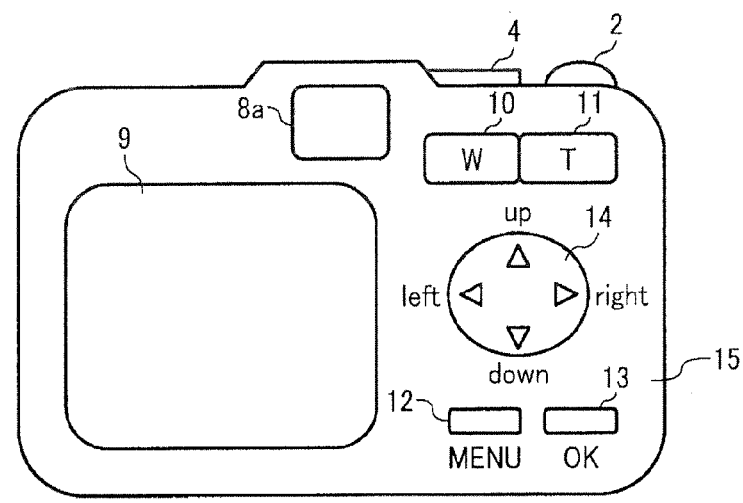

FIGS. 1A to 1C are diagrams showing the external appearance structure of an imaging device.

Figure 2:
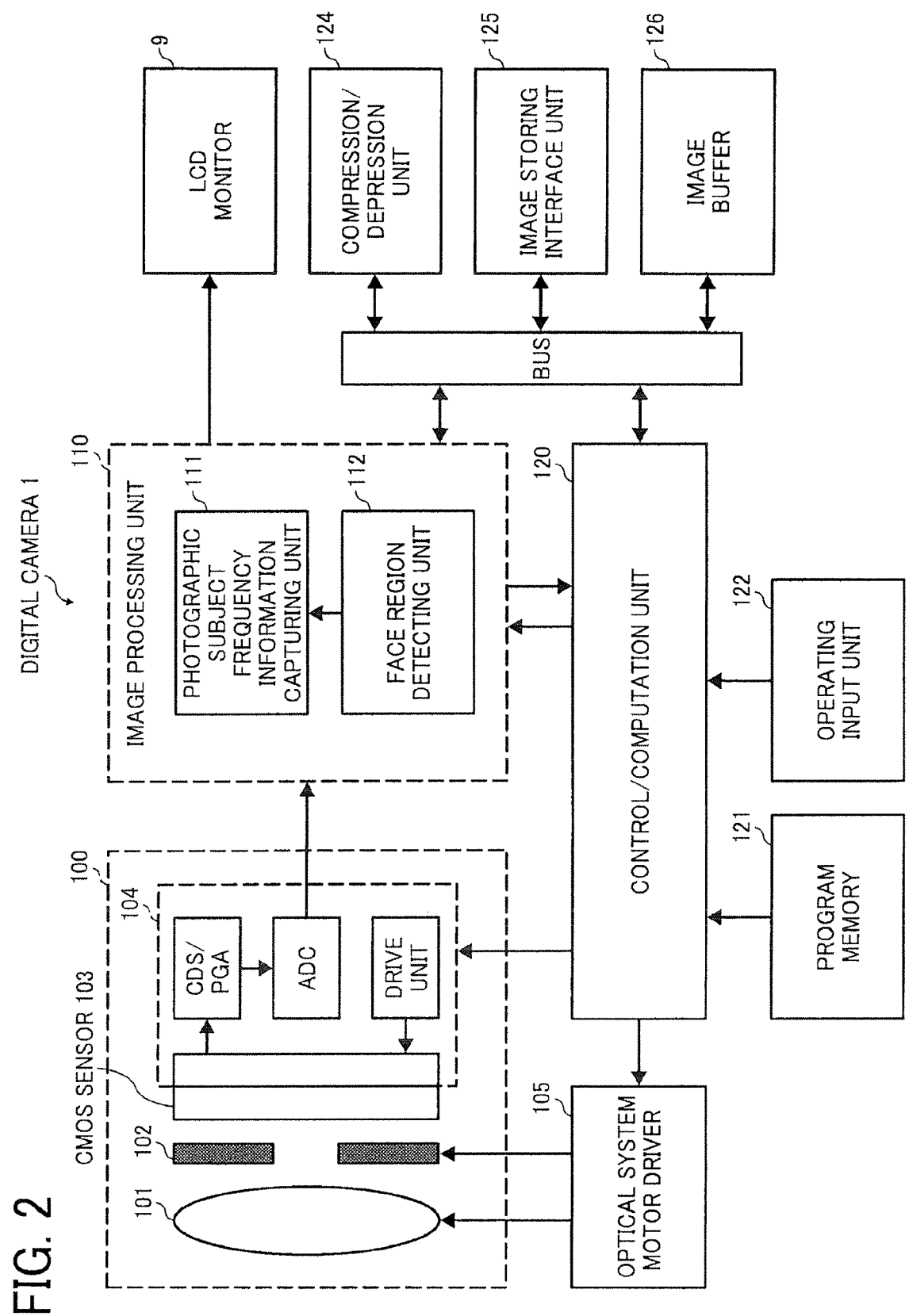
FIG. 2 is a schematic block diagram illustrating a system structure in the digital camera illustrated in FIGS. 1A to 1C.

FIG. 1A is a front view, FIG. 1B is a top view, and FIG. 1C is a back view of a digital still camera (hereinafter, it is called a "digital camera") as an example of an imaging apparatus according to a first embodiment of the present invention. FIG. 2 is a schematic block diagram illustrating a system structure in the digital camera illustrated in FIGS. 1A to 1C.

(External Appearance Structure of an Imaging Device)

As illustrated in FIGS. 1A to 1C, on a top side of the imaging device 1, a release button (shutter button) 2, a power button 3, and a photographing/playback switch dial 4 are provided. On a front side of the imaging device 1, a lens barrel unit 6 having a photographing lens system 5, a stroboscopic light emitting section (flash) 7, and an optical viewfinder 8 are provided.

On a back side of the imaging device 1, a liquid crystal display (LCD) monitor 9, an eyepiece lens section 8a of the optical viewfinder 8, a wide angle side zoom (W) switch 10, a telephoto angle side zoom (T) switch 11, a menu (MENU) button 12, a confirmation (OK) button 13, an arrow key button 14 and so on, are provided. Additionally, inside a side of the imaging device 1, a memory card storing section 15 is provided. The memory card storing section 15 stores a memory card which saves photographed image data.

(System Structure of the Imaging Device)

As illustrated in FIG. 2, an optical unit 100 has a lens system 101 (a zoom lens, and focus lens), a diaphragm shutter 102, an optical low-pass filter 103 and a CMOS sensor 104. Although a CCD sensor can be used instead of the CMOS sensor 104, it is preferred to use the CMOS sensor 104 which is capable of fast readout. In addition, the photographing lens system 5 in FIG. 1 is a generic term used to refer to the lens system 101 and diaphragm shutter 102 as shown in FIG. 2.

The lens system 101 mechanically moves in response to a focus position. The diaphragm shutter 102 switches to a diaphragm diameter which is suited for the photographing condition, and operates shutting-or-opening of the shutter. Those movements are driven by an optical system motor driver 105. The optical system motor driver 105 receives a driving instruction from a control/computation unit 120.

The CMOS sensor 104 converts an optical image, which is imaged in a light receiving element, arranged in a matrix in a plane, to electric charges and outputs the electric charges as an electric signal (photographed image data) in response to a readout timing sent from a drive unit embedded in it. The photographed image data output from the CMOS sensor 104 is then image processed in an image processing unit 110. If the photographed image data is for a recorded image, it would be stored in a recording medium (SD card, compact flash memory card, XD picture card, and the like) via a compression/decompression processing unit 124 and an image recording interface unit 125.

In the following explanation of preferred embodiments of the present invention, "recording image" is used for the photographed image data when the release button 2 has been fully pressed, and "displaying image" is used for the photographed image data under live-view function which functions before the release button 2 has been fully pressed.

During the live-view function, the image processing unit 110 of the imaging device 1 processes the photographed image data as the displaying image, and constantly sends it to the LCD panel 9 to update displaying of the LCD panel 9 constantly.

In addition, the LCD panel 9 displays a representative image. The image processing unit 110 could be configured by many functions. A face-region detecting unit 112 and photographic subject frequency information capturing unit 111 are shown as typical functions.

The operation input unit 122 includes the release button 2, the photographing/playback switch dial 4, the wide angle side zoom switch 10, the telephoto side zoom switch 11, the menu (MENU) button 12, the confirmation (OK) button 13, the arrow key 14 and the like, on an external surface of the imaging device 1 (see FIGS. 1A to 1C).

Operation for selecting a region within an image so as to obtain a focused image which has a focused region corresponding to the selected region can be achieved by using the operation input unit 122.

The buffer 126 is used for a buffer memory buffering an image(s).

The image processing unit 110 can be configured to output a TV video signal so as to display images on a TV or monitor which are provided and serve as external display devices.

First, an outline of a first preferred embodiment is explained.

The imaging device 1 executes Auto-Focus bracket photographing, which photographs a plurality of still images (recording images) at different focal positions.

Predetermined image processing and storing processing are applied for each of the still images (recording images). The face recognition technology is applied to each of the images so as to detect a face region(s) from each of the still images (recording images). Further, predetermined filter processing and computation are applied to every detected face region to obtain a focus degree for each detected face region.

Then, the plurality of still images (recording images) are stored in a single file (a multi-page file) along with the calculated focus degree, and coordinate information indicates the calculated focus degree corresponding to the respective face region of the respective recording images.

A still image (recording image) having the highest focus degree is extracted by comparing the auto-focus degree of a face region between the still images (recording images), and the extracted image is stored as a compressed image in a JPEG formatted file which is different from the multi-page file.

Therefore, the imaging device 1 is capable of face recognition technology, Auto-Focus bracket photographing, and image extraction.

If several persons are detected by this photographing, a best focused image for each person can be extracted, or a best focused image can be extracted for a person who is desired to be focused. To automatically select a person, a person who is near a center region of the image can be selected, or a person who is closest in camera-to-subject distance can be selected. The focus degree or a size of a detected face region can be used to determine the camera-to-subject distance.

Figure 3:
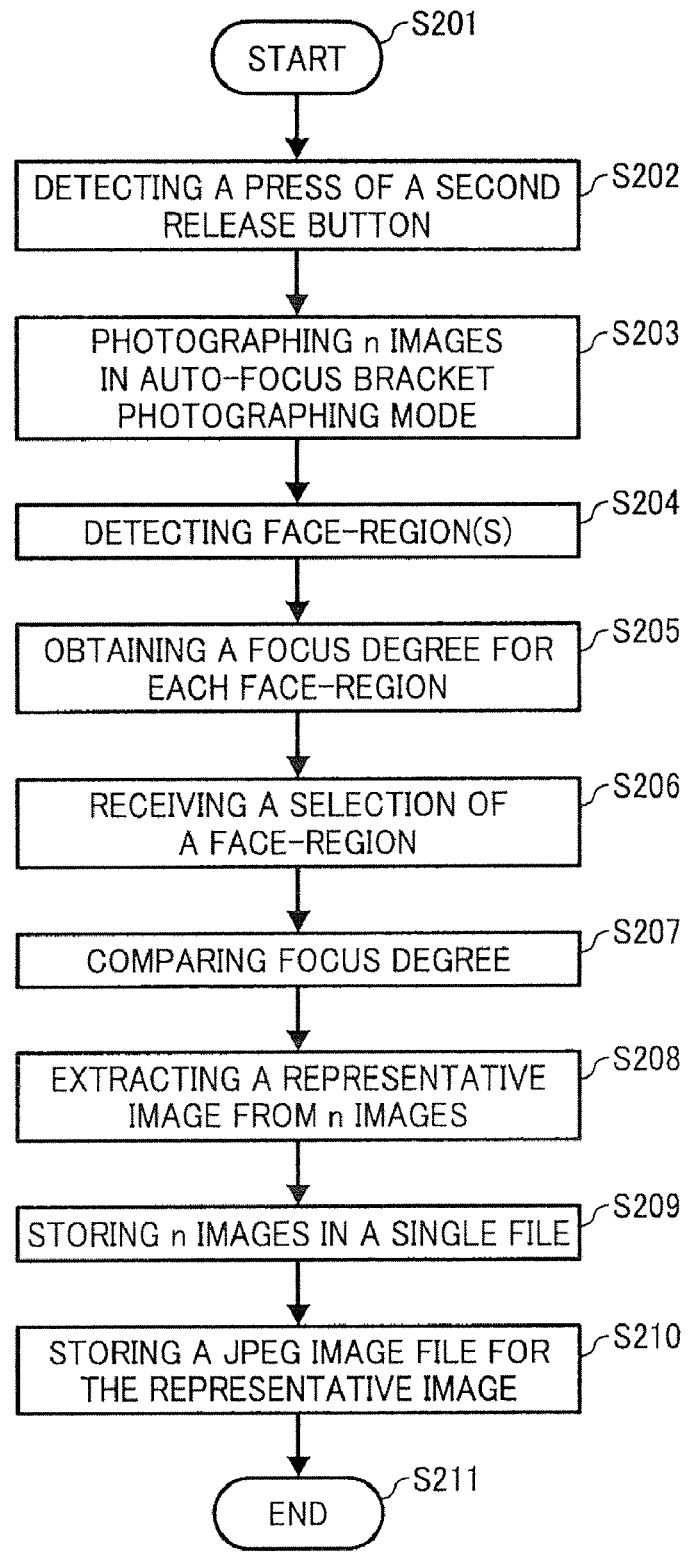
FIG. 3 is a flowchart showing processes of the first embodiment of the present invention.

FIG. 3 is a flowchart showing processes of the first embodiment of the present invention.

The process starts after the power of the imaging device 1 is turned on by pressing the power button 3 and continuous photographing mode is selected by a photographing/playback switch dial 4 (STEP S201).

Auto-Exposure condition (AE condition) is locked in current exposure condition by pressing the release button 2 halfway (First release condition). It becomes possible to prevent a change in brightness during continuous photographing by locking the Auto-exposure condition.

When the control/computation unit 120 detects a full-press of the release button 2 (STEP S202) (Second release condition), the imaging device 1 starts Auto-Focus bracket photographing and obtains n recording images (STEP S203). If the release button 2 is released while in the first release condition, the lock of Auto-Exposure condition will be cancelled (released).

Auto-Focus bracket photographing (shooting) is executed by driving the focus lens 101 from a predetermined position and driving a focus position from closest to infinity or from infinity to closest.

Auto-Focus bracket photographing is executed by moving the focal position slightly in each photographing and is continued until n recording images are obtained.

The face region detecting unit 112 of the image processing unit 110 detects a face region(s) in each recording image (STEP S204).

Then the photographic subject frequency information capturing unit 111 obtains a focus degree for each detected face region(s) (STEP S205).

The processing of S204 and S205 are executed for all n recording images.

Then the control/computation unit 120 automatically selects a certain face region from the plurality of detected face regions (STEP S206).

The control/computation unit 120 compares an auto-focus degree for the selected face region between n recording images (STEP S207), and extracts a recording image (an extracted recording image) that has the highest focus degree for the selected face region (STEP S208).

Then the control/computation unit 120 associates a recording image with the focus degree for each face region, and the coordinate information indicates the calculated focus degree corresponding to the respective face region, and stores the n recording images in a single file (a multi-page file) (STEP S209).

Further, the control/computation unit 120 stores the extracted image in a JPEG formatted file which is different from the multi-page file (STEP S210).

There are two ways, as described below, for automatically selecting the face region in STEP S206, if several face regions are detected.

(1) Extracting a recording image with a highest focus degree for each detected face region, and storing separately each extracted recording image in a JPEG formatted file.

(2) Extracting a biggest face region by comparing sizes of the detected face regions, extracting a recording image with a highest focus degree for the biggest face region, and storing the extracted recording image in a JPEG formatted file.

If the sizes of the detected face regions are the same, a closest face region can be selected by using the focus degree for each face region or a face region with higher focus degree.

Figure 4:
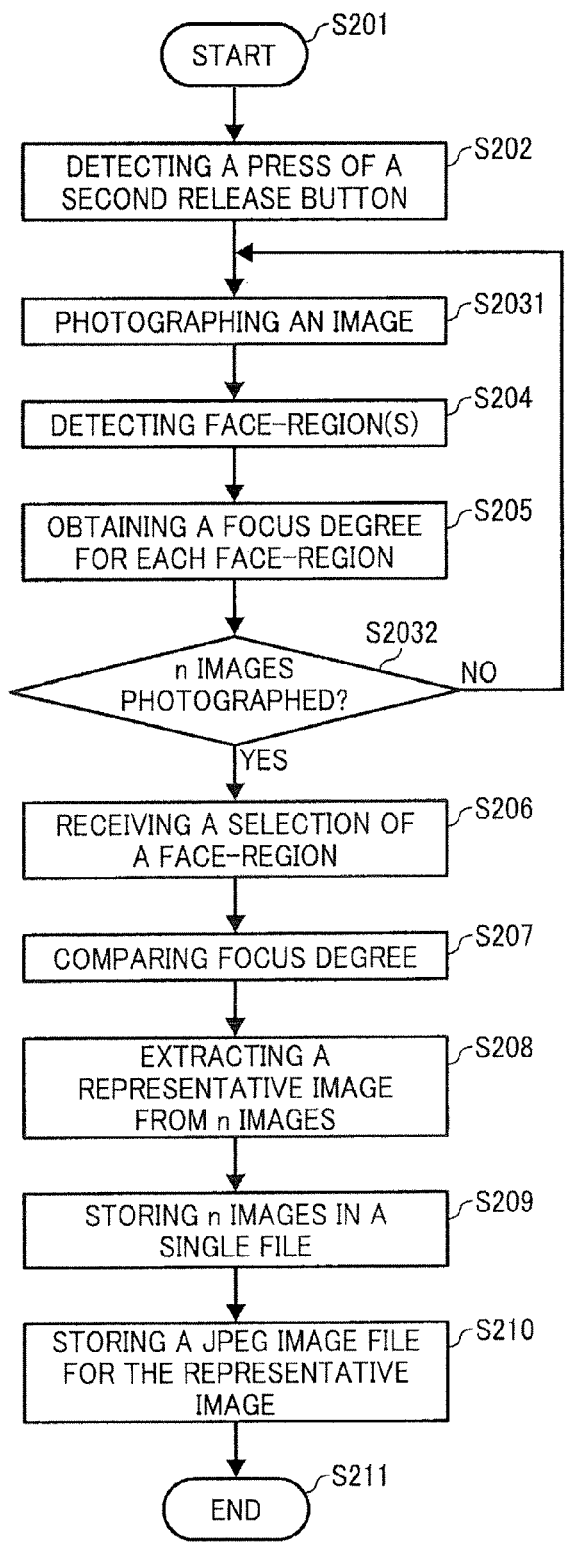
FIG. 4 is a flowchart showing processes of an alternative embodiment of the first embodiment.

FIG. 4 is a flowchart showing processes of an alternative embodiment of the first embodiment.

The processes having the same number in FIG. 3 are the same in the processes of the first embodiment. In the first embodiment, detecting face region(s) and obtaining a focus degree for a detected region are executed after photographing n recording images by Auto-Focus bracket photographing. In the alternative embodiment, as shown in FIG. 4, when a recording image is photographed (STEP S2031), the face region detecting unit 112 detects a face region(s) from the recording image (STEP S204) and the photographic subject frequency information capturing unit 111 obtains a focus degree for each detected face region (STEP S205). These processes are repeated until n recording images are photographed (STEP 2032).

An outline of a second preferred embodiment of the present invention is explained.

First, the imaging device 1 executes Auto-Focus bracket photographing which photographs a plurality of still images (recording images) at different focal positions.

Predetermined image processing and storing processing are applied to each of the still images (recording images). The face recognition technology is applied to each of the still images (recording images) so as to detect a face region(s) from each of the still images (recording images). Further, predetermined filter processing and computation are applied to every detected face region(s) to obtain a focus degree for each detected face region. Then the plurality of still images (recording images) are stored in a single file (a multi-page file) along with the calculated focus degree, and coordinate information indicates the calculated focus degree corresponding to the respective face region of the recording image.

When the imaging device 1 is switched to a reproduction mode, the imaging device 1 displays a recording image (a representative image) among the plurality of the still images.

When a user selects a face region which is desired to be focused, the imaging device 1 compares the degree of focus of the selected face region among the still images (recording images). The image device 1 extracts the still image (recording image) that has the highest focus degree and stores it in a JPEG formatted file which is different from the multi-page file.

Therefore, the image device 1 is capable of the face recognition technology, Auto-Focus bracket photographing, and image extracting technique.

Figure 5A:
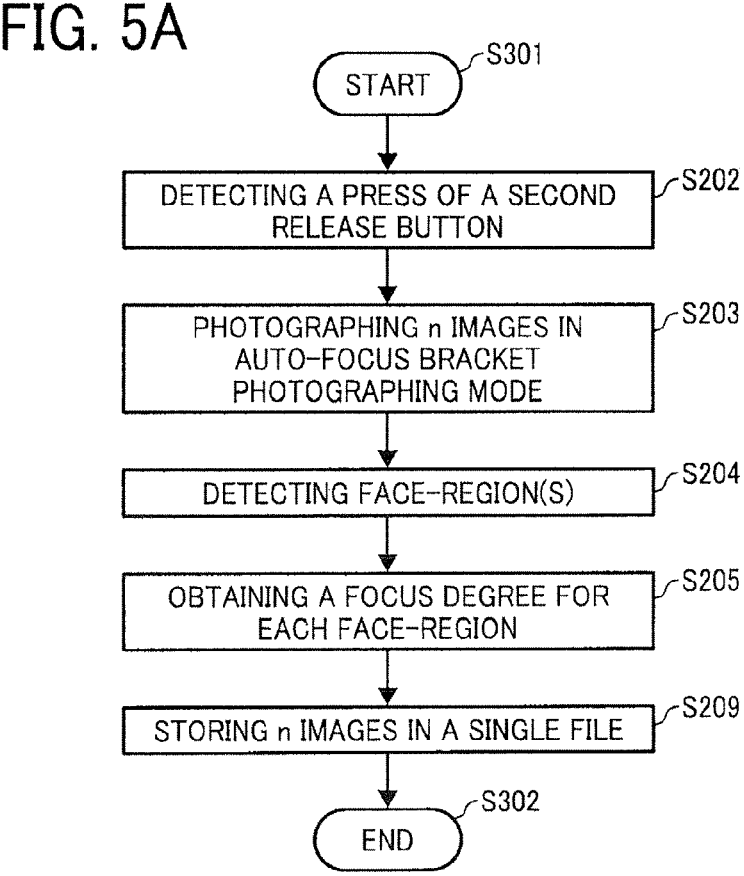
FIGS. 5(a) and 5(b) are flowcharts showing processes of the second embodiment of the present invention.
Figure 5B:
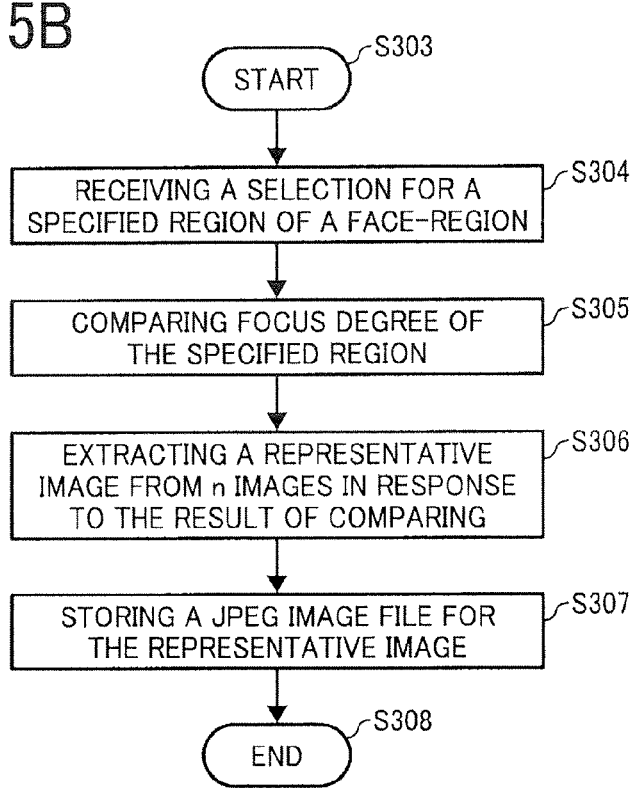

FIGS. 5(*a*) and 5(*b*) are flowcharts showing processes of the second embodiment of the present invention. Processes that have the same number in FIG. 3 are the same as the processes of the first embodiment.

The processes from S201 to S205 in FIG. 5(*a*) are the same processes of the first embodiment, so explanation for these processes are spared in this embodiment.

In the second embodiment, the control/computation unit 120 associates a recording image with focus degrees for each face region, and coordinate information indicates the calculated focus degree corresponding to the respective face region of the respective recording image. The unit 120 stores the n recording images in a single file (a multi-page file) (STEP S209) after obtaining a focus degree for each detected face region in S205.

When the control/computation unit 120 stores the multi-page file, it is the end of processes for FIG. 5(*a*).

When the imaging device 1 is switched to a reproduction mode, it is a start of processes of FIG. 5(*b*). The image processing unit 110 of the imaging device 1 displays one of the recording images stored in the multi-page file, as an extracted image, on the LCD monitor (STEP S303). Then a user selects a face region which is desired to be focused on the displayed extracted image by using operation input unit 122, such as arrow key button 14. The control/computation unit 120 detects the selected face region (STEP S304).

Figure 7:
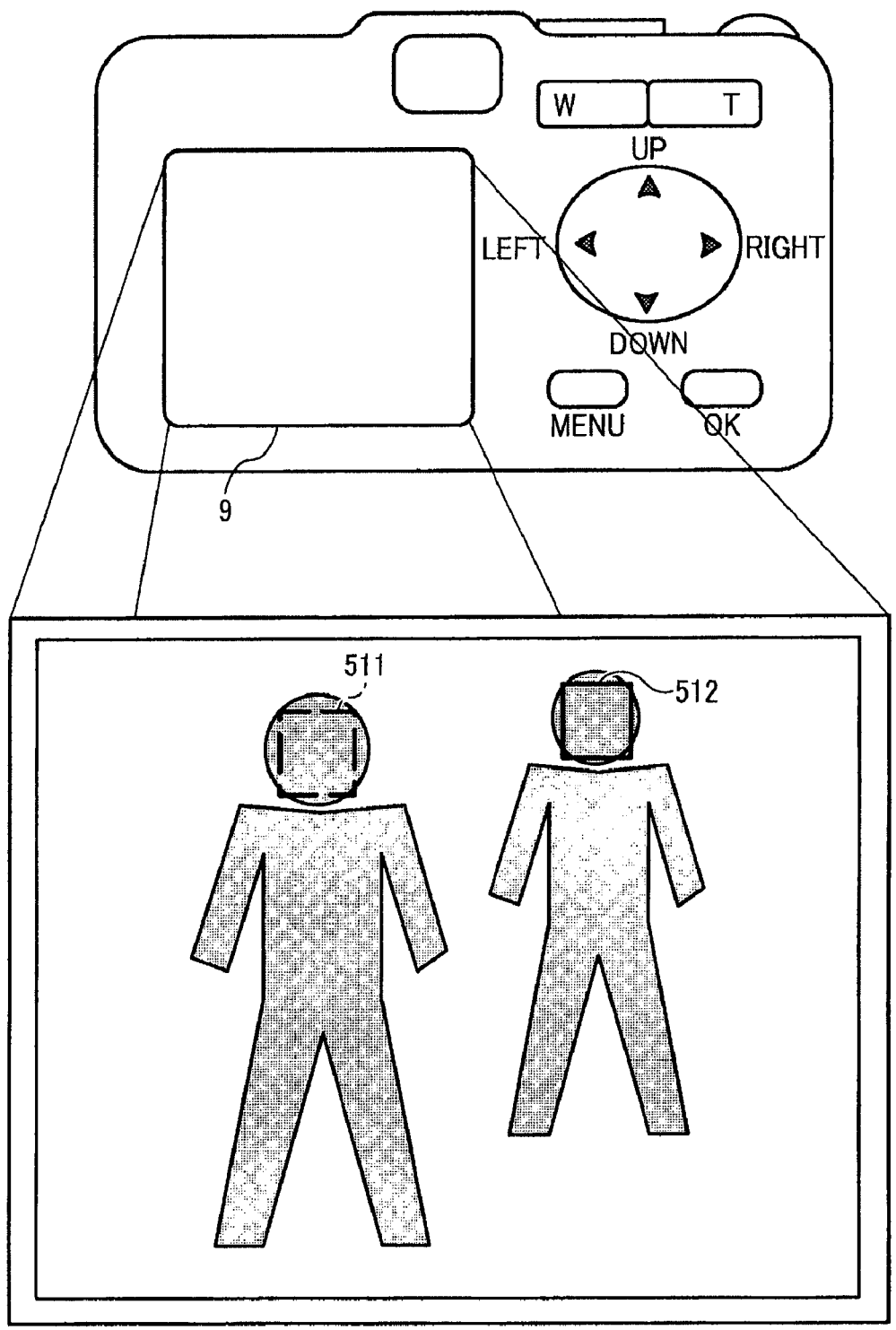
FIG. 7 is a diagram showing a user interface for selecting the face region on the displayed extracted image.

FIG. 7 is a diagram showing a user interface for selecting the face region on the displayed extracted image and is used for detailed explanation of the process of S304.

When the extracted image is displayed on the LCD monitor 9, face regions of the extracted image are surrounded by on-screen display (OSD) frames (511, 512).

The OSD frame with the solid line (512) indicates a current designated face region and the OSD frame (511) with the dashed line indicates a non-designated face region.

If the user wants to select a face region surrounded by an OSD frame (511), the user can switch the selected OSD frame by pressing the arrow key 14. Namely, the user switches the OSD frame with solid line to the other OSD frame which is desired to be focused by using the arrow key 14 and determines the selected face region by pressing the OK button 13.

When the user selects the face region, the control/computation unit 120 compares focus degrees of the selected face region for n recording images (STEP S305), and extracts a recording image with the highest focus degree as a representative image. Then, the control/computation unit 120 stores the representative image in a JPEG formatted file (STEP S307).

Figure 6:
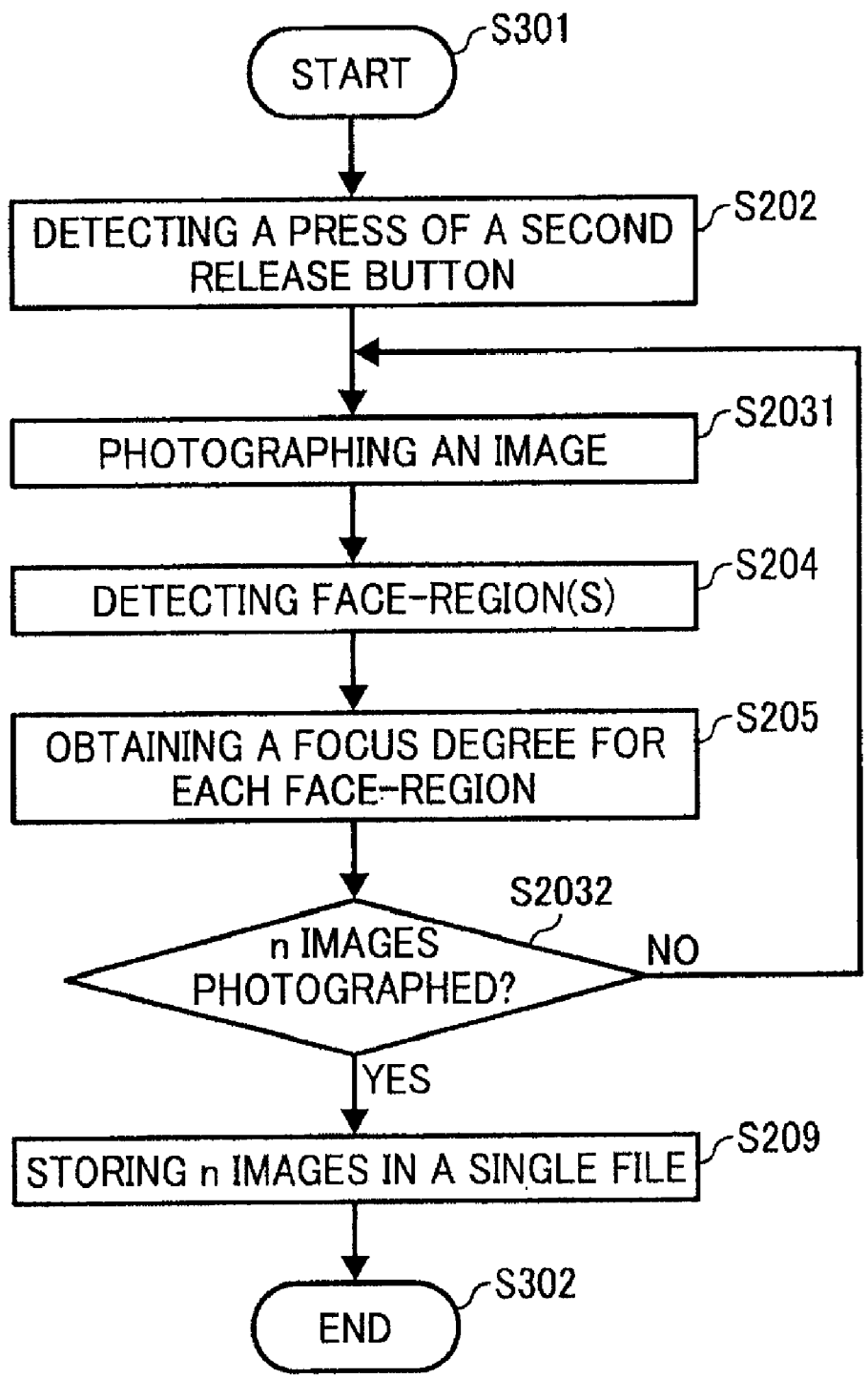
FIG. 6 is a flowchart showing processes of an alternative embodiment of the second embodiment shown in FIG. 5(A).

FIG. 6 is a flowchart showing processes of an alternative embodiment of the second embodiment. The processes having the same number in FIGS. 4, 5(*a*) or 5(*b*) are the same as the processes of the first embodiment or the second embodiment.

In FIG. 5(a) of the second embodiment, detecting face region(s) and obtaining a focus degree for a detected region are executed after executing Auto-Focus bracket photographing for n recording images. In this alternative embodiment, as shown in FIG. 6, the face region detecting unit 112 detects face region(s) from the recording image (STEP S204) and the photographic subject frequency information capturing unit 111 obtains focus degree for each detected face region (STEP S205) after a recording image is photographed (STEP S2031). These processes are repeated until n recording images are photographed (STEP 2032).

<OSD Frame>

In this section, OSD frames used in the first and the second embodiment are explained.

Figure 8:
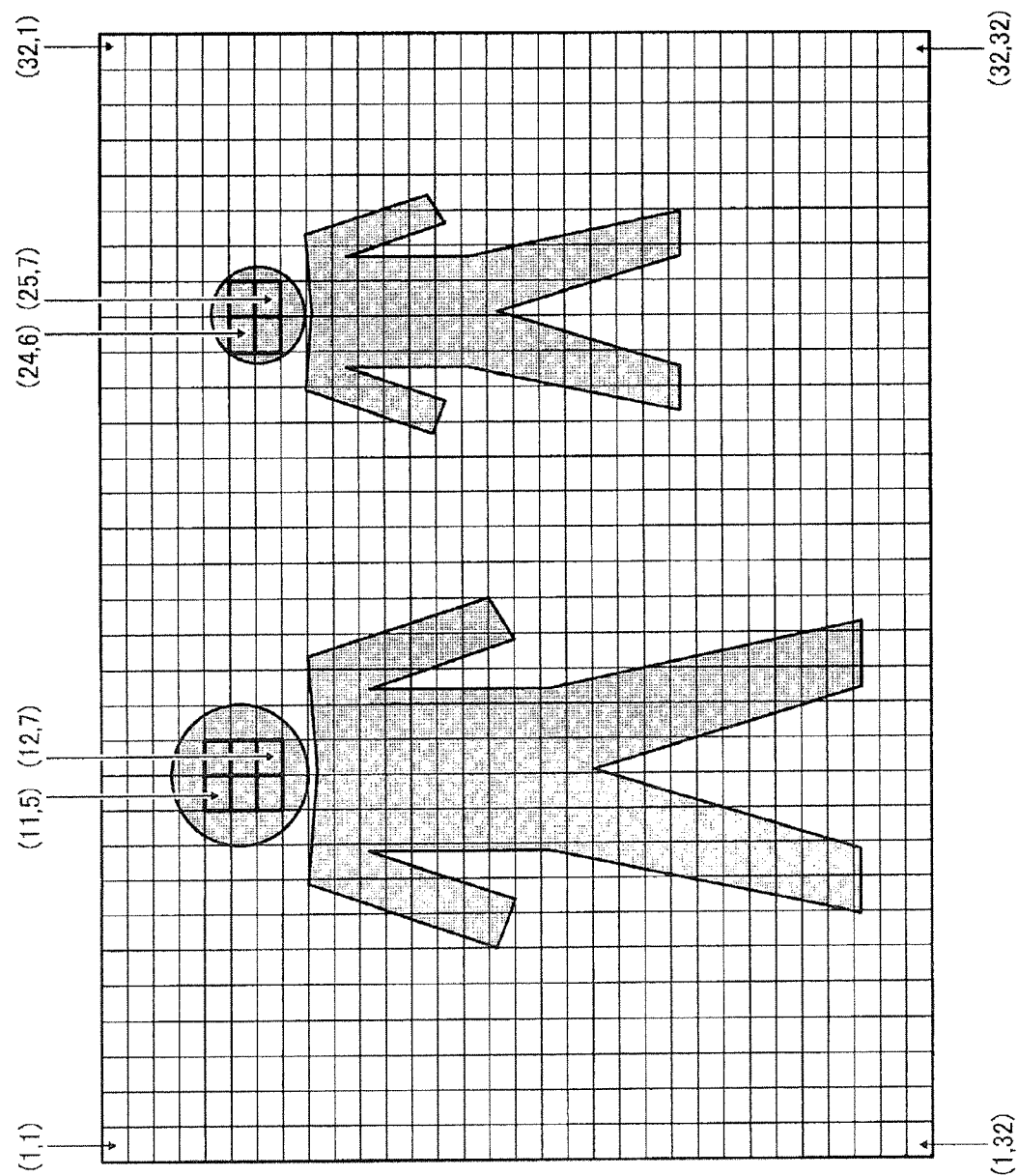
FIG. 8 is a diagram showing location information and size information of the OSD frames.

FIG. 8 is a diagram showing location information and size information of the OSD frames.

The image processing unit 10 has the photographing subject frequency information capturing unit 111 and the face region detecting unit 112.

The photographing subject frequency information capturing unit of the image processing unit 110 divides a recording image into blocks lengthwise and crosswise, and obtains photographing subject frequency information for each block. Each block has coordinate information that indicates location of the block within the recording image.

In FIG. 8, the number of partitions are 32 as an example. In FIG. 8, the coordinate information for a block of the upper left corner is (1,1) and the coordinate information for a block of the lower right corner is (32,32).

The face region detecting unit 112 executes face region recognition processing by executing pattern matching processing which recognizes face characteristics, such as nose, mouth, eyes, eyebrow, or the like. The face region detecting unit 112 then detects face region(s) by selecting a block(s) that is recognized in pattern matching processing. The blocks that correspond to the detected face region are drawn in bold OSD frames as shown in FIG. 8.

<Multi-Page File>

In this section, the multi-page file used in the first and the second embodiments are explained.

When n recording images that are photographed continuously at different focal positions will be stored in a single file, each of the n recording images, focus degrees for each face region detected in the recording image, and coordinate information for each face region are associated and stored in a single file (a multi-page file). At this time, coordinates of the upper left block of the face region and of the lower down block of the face region are sufficient to store as coordinate information for the face region. ((11,5), (12,7)) and ((24,6), (25,7)) would be coordinate information in the example of FIG. 8, and they are stored in the multi-page file. In addition, it is sufficient to store only focus degrees of blocks detected as a face region.

Figure 10:
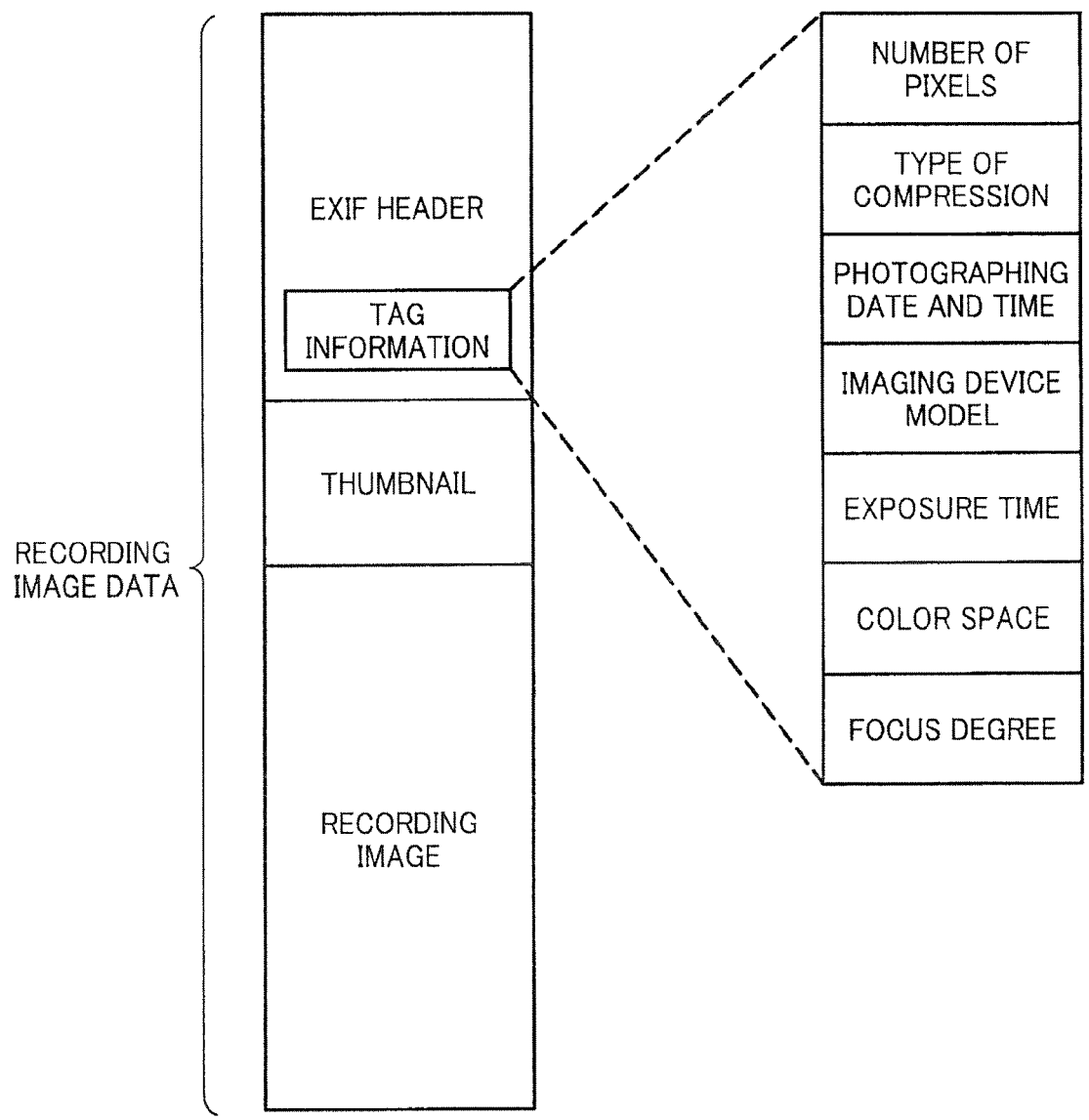
FIG. 10 is a diagram showing header tag information in EXIF format which is standardized in JEIDA (Japanese Electronic Industry Development Association).
Figure 11:
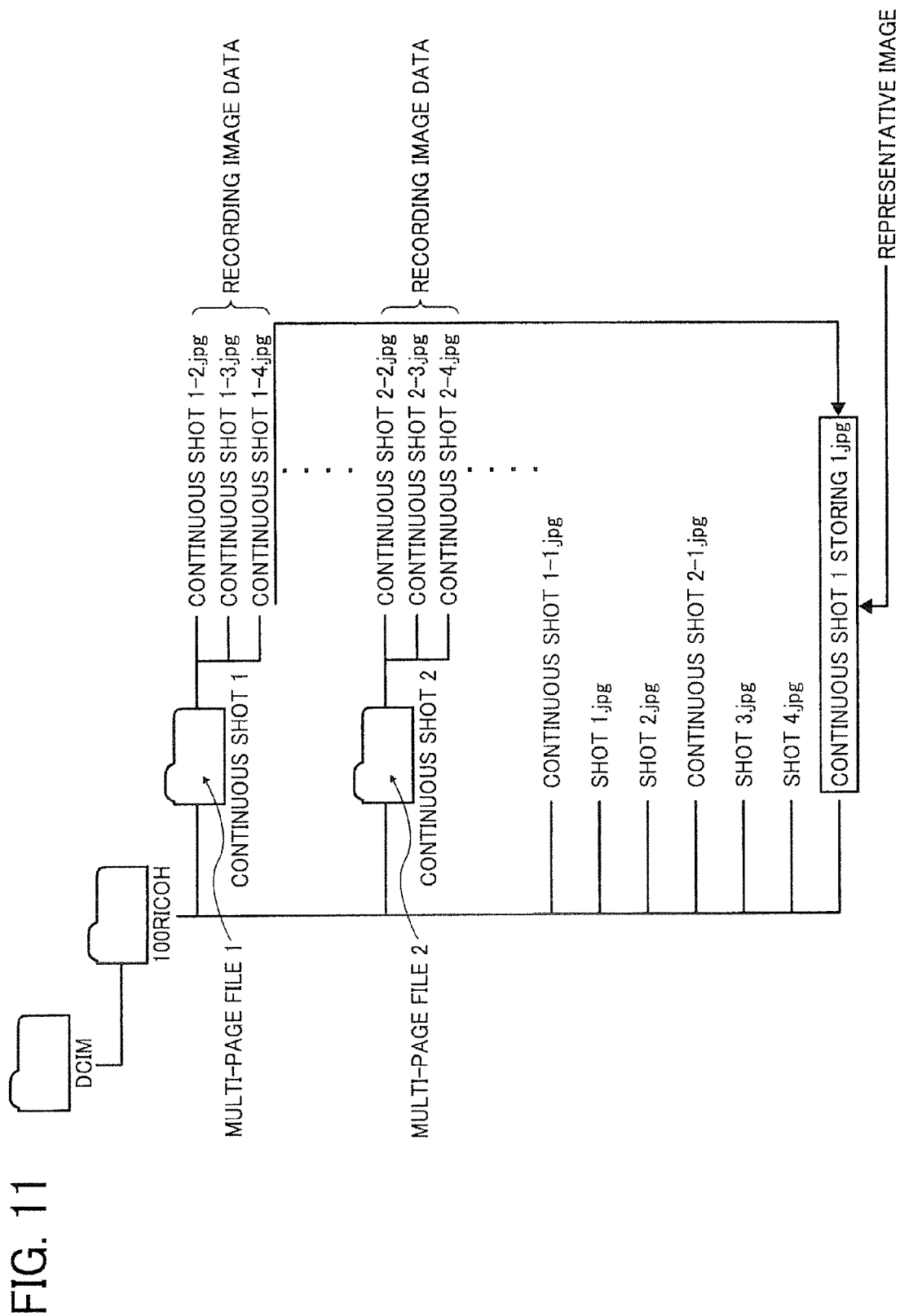
FIG. 11 is a diagram showing a first embodiment of the multi-page file.

A first embodiment of the multi-page file is explained using FIGS. 10 and 11.

FIG. 10 is a diagram showing header tag information in EXIF format which is standardized in JEIDA (Japanese Electronic Industry Development Association).

If a recording image is stored as recording image data using EXIF format, coordinate information and focus degree are stored in tag information of the EXIF header along with information that includes an image capturing device model, a photographing date and time, diaphragm information, shutter speed or the like.

FIG. 11 is a diagram showing a first embodiment of the multi-page file. As shown in FIG. 11, n recording image data which are photographed in Auto-Focus bracket photographing are stored in a folder named "continuous shot 1", and thus a multi-page file is generated.

The generated multi-page file is achieved by storing it in a storage device within the imaging device 1. Alternatively, the file may be stored in a recording medium such as a SD card, via the image storing interface unit 125. The automated extracting of the representative image in the first embodiment and selecting an extracted image in the second embodiment are executed based on the coordinate information and the focus degree stored in the EXIF file.

Figure 12:
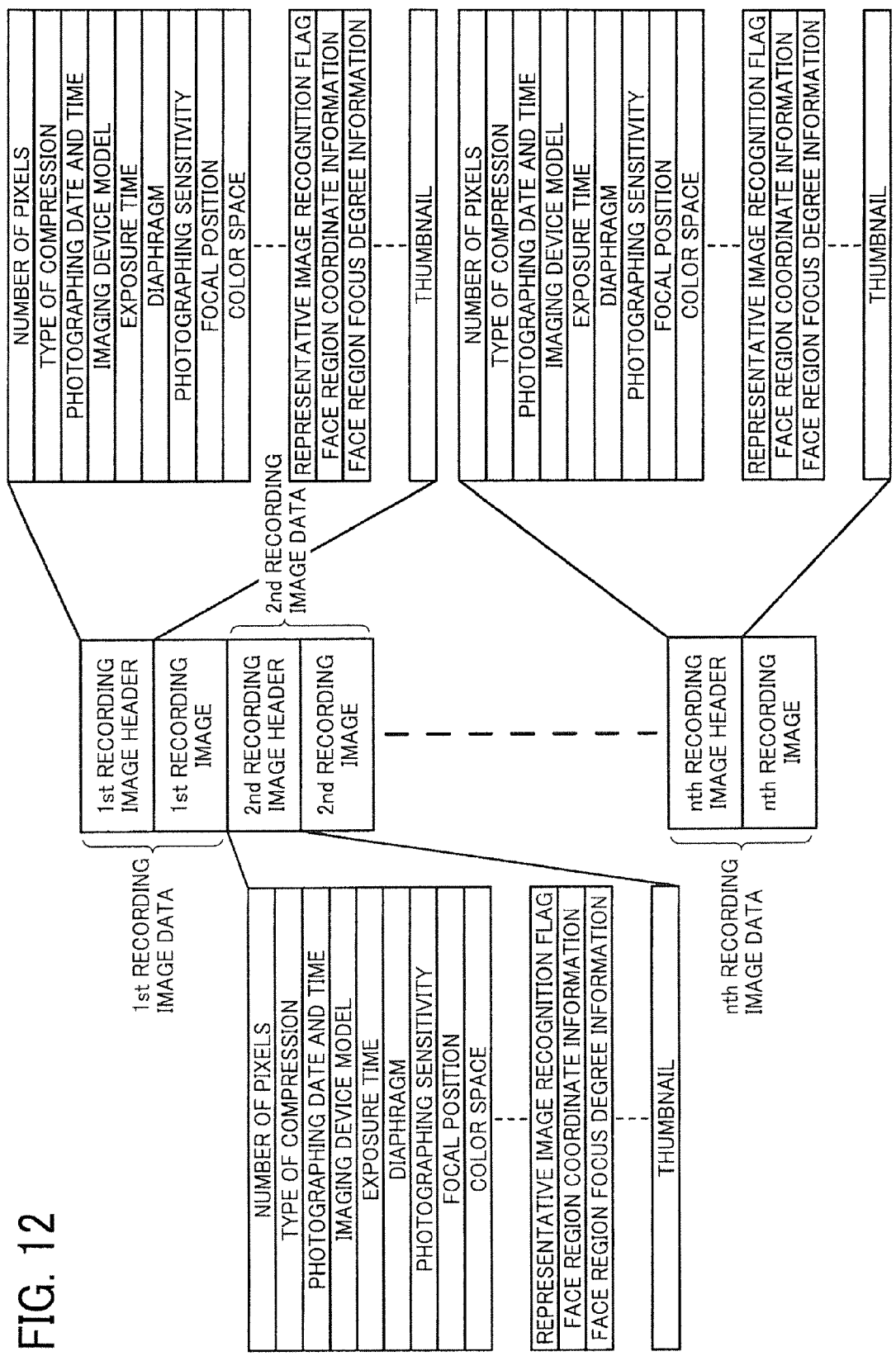
FIG. 12 is a diagram showing a second embodiment of the multi-page file.

FIG. 12 is a diagram showing a second embodiment of the multi-page file. The difference from FIG. 11 is that the second embodiment of the multi-page file is generated by coupling n recording image data together.

Regarding the second embodiment of the multi-page file, each recording image has a recording image header and a recording image, and the recording images data are coupled in order of photographing.

The recording image header stores a photographing condition data, which is a data of the imaging device 1 of when the recording image is photographed. The photographing condition data includes the number of pixels, the type of compression, the photographing date and time, the image capturing device model, the exposure time, the diaphragm, the photographing sensitivity, the focal position, the color space or the like.

In addition to the above mentioned data, the recording image header stores a representative image identification flag which is used for identifying whether the recording image is a representative image, the coordinate information which shows the coordinate of the detected face region within the recording image, and a focus degree(s) of each detected face region.

Further, the recording image header stores a thumbnail of the recording image.

The representative image identification flag is a flag for distinguishing a recording image which is set as a representative image from other recording images by 1, 0. It is updated when the recording image that is set as a representative image is stored in a JPEG formatted file that is different from the multi-page file by activating a flag of the recording image.

Similarly to the first embodiment of the multi-page file, the second embodiment of the multi-page file is achieved by storing it in a storage device within the imaging device 1, or within a recording medium such as an SD card, via the image storing interface unit 125.

An outline of a third preferred embodiment of the present invention will now be explained.

The third embodiment is intended to apply face recognition technology to a displaying image which is displayed on the LCD panel 9 when the imaging device 1 is on live-view mode.

The imaging device 1 runs the face recognition function when it executes hill-climbing scanning so as to acquire a camera-to-subject distance for detected face regions. and the imaging device 1 executes Auto-Focus bracket photographing based on the acquired distance. It can be used to obtain a still image which is focused on a target face.

While the first embodiment and the second embodiment are aiming for selecting a good focused image from images already photographed, the third embodiment is aiming at how a good focused image can be photographed.

The hill-climbing scan is a dedicated mode for rapid autofocus. It reads out only image regions which will be used for focus computation processing within the image surface and flushes other regions at high speed.

FIGS. 9A through 9D are diagrams showing examples to determine a range of auto-focus.

The third embodiment relates to a prior processing of the imaging device 1 explained in the first and the second embodiments.

More particularly, it relates to a processing to determine a range in focal position of Auto-Focus bracket photographing, which is done after the continuous photographing (shooting) mode is selected by the photographing/playback switch dial 4 of the imaging device 1 and before the release key 2 of the imaging device 1 is pressed halfway.

In the third embodiment, it is necessary to obtain distance information within the detected face region. A way to obtain the distance information by hill-climbing scanning is explained in connection with FIGS. 9A through 9D. It can be also achieved by mounting a ranging sensor which outputs distance information.

As described in the first and second embodiments, the image processing unit 110 of the imaging device 1 includes the face region detecting unit 112 and photographic subject frequency information capturing unit 111. Those units can be used for the hill-climbing scanning which is executed while the live-view function mode runs.

Figure 9A:
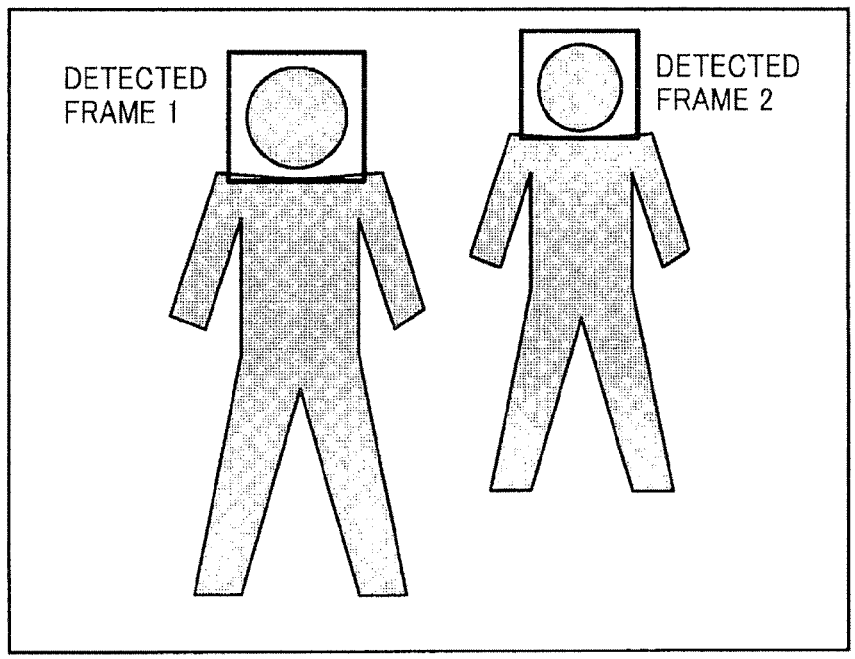
Figure 9B:
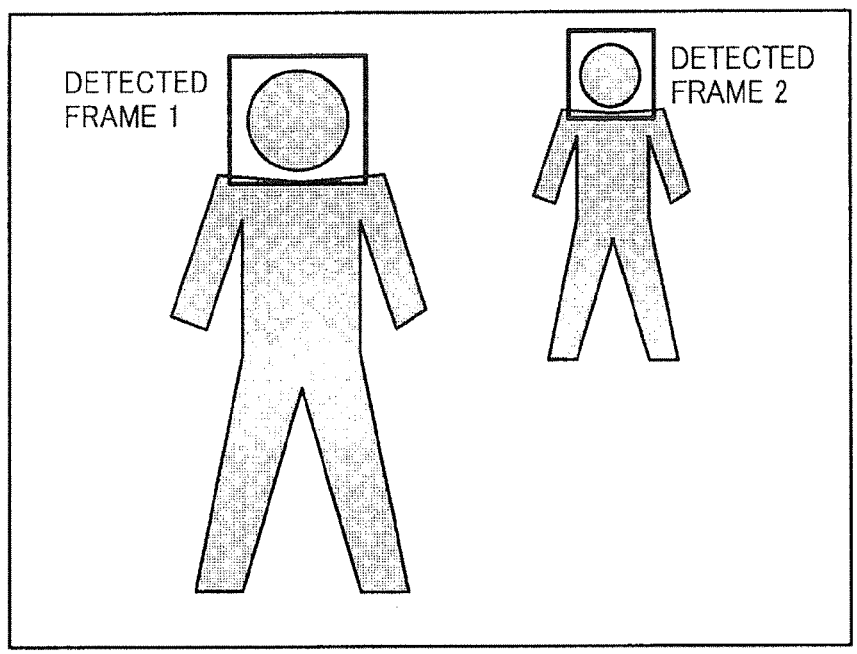

FIG. 9A shows an LCD panel 9 in live-view function mode, where two persons stand at 1 m and 2 m from the imaging device 1, respectively, as photographing subjects. FIG. 9B shows a display of LCD panel 9 in live-view function mode where two persons stand at 1 m and 4 m from the imaging device 1, respectively, as photographing subjects.

Both FIGS. 9A and 9B show a detecting frame 1 and a detecting frame 2, as OSD frames, displaying the detected face regions by face recognition function.

FIG. 9C is a diagram showing photographing subject high-frequency component integrating values which are integrating values of high-frequency component of the detecting frame 1 and the detecting frame 2, when the hill-climbing scanning is executed in live-view function mode of FIG. 9A. In the same manner, FIG. 9D is a diagram showing photographing subject high-frequency component integrating values of FIG. 9B.

While the photographing subject high-frequency component integrating value for the detecting frame 2 of FIG. 9C has a peak at 2 m, it has a peak at 4 m for FIG. 9D.

Auto-Focus bracket photographing is executed based on the result by attaching much importance on the peaks of these detected frames, as black dots are shown in the figure, so as to obtain images which are focused on the detected person.

Namely, d1 through d2 are set for a region of Auto-Focus bracket photographing in the case of FIG. 9C, and d1 through d3 are set for a region of Auto-Focus bracket photographing in the case of FIG. 9D.

As shown in FIGS. 9C and 9D, set regions for Auto-Focus bracket photographing are determined so as to include peaks of photographing subject high-frequency component integrating values of the detecting frame 1 and the detecting frame 2.

In the resolution of the live-view function mode is output in lower resolution than the resolution of the recording image, since a frame rate for the live-view function mode is required to be rapid. Therefore, the precision of the displaying image is lower than that of the recording image. This is the reason to set a region for Auto-Focus bracket photographing that includes both peaks so that the difference in focus precision can be redeemed.

The present invention is not limited to the disclosed embodiments. Variations and modifications may be made without departing from the scope of the present invention.

The present application claims priority to Japanese Patent Application No. 2008-024637, filed Feb. 5, 2008, and to Japanese Patent Application No. 2008-312262, filed Dec. 8, 2008. The entire disclosures of Japanese Applications Nos. 2008-024637 and 2008-312262 are incorporated herein by reference.

What is claimed is:

1. An imaging device comprising:
a first operation input unit configured to receive a photographing instruction from a user;
a photographing optical system including a focus-shift structure configured to shift a focal position;
an image sensing element configured to convert an optical image of a photographing subject received from the photographing optical system to image data;
an image processing unit including a face region detecting unit and a photographing subject frequency information capturing unit, wherein the face region detecting unit is configured to detect a face region from the image data and obtain face region information indicating the detected face region, and wherein the photographing subject frequency information capturing unit is configured to capture focus degree information indicating a degree of focus for each detected face region;
a recording unit configured to record a file; and
a control unit configured to control the first operation input unit, the photographing optical system, the image processing unit and the recording unit; and
wherein the control unit obtains plural image data with different focal positions by controlling the focal position of the photographing optical system in response to the photographing instruction, obtains the face region information and the focus degree information for each image data, and stores the plural image data, the face region information and the focus degree information in the recording unit as a single file; and
wherein the imaging device further comprises a display configured to display image data, and a second operation input unit configured to receive a selection instruction indicating a selection of a face region from the user, wherein the control unit extracts an extracted image data and its face region information from the single file, displays the extracted image data to the display along with an indication indicating face region within the extracted image data, extracts representative image data having the highest focus degree among the plural image data stored in the single file in response to the selection instruction received in the second operation input unit, and stores the representative image data as a file, which is different from the single file, in the recording unit.

2. The imaging device as claimed in claim 1, wherein the image sensing element is further configured to convert an optical image of a photographing subject received from the photographing optical system to displaying image data to be displayed in the display, wherein the face region detecting unit is configured to obtain the face region information from the displaying image data, and wherein the photographing subject frequency information capturing unit is configured to obtain the focus degree information for the detected face region of the displaying image data, and wherein the control data determines a range of the focal position for the photographing optical system based on the face region information and the focus degree information of the displaying image data, and shifts a focal position of the photographing optical system based on the determined range.

3. The imaging device as claimed in claim 1, wherein the single file is a folder that includes the plural image data, and each of the image data has a header, which stores the face region information and the focus degree information, and an image.

4. The imaging device as claimed in claim 1, wherein the single file is a multi-page file which combines a plurality of the image data together, and each of the image data includes a header, which stores the face region information and the focus degree information, and an image.

5. An imaging device comprising:
- a first operation input unit configured to receive a photographing instruction from a user;
- a photographing optical system including a focus-shift structure configured to shift a focal position;
- an image sensing element configured to convert an optical image of a photographing subject received from the photographing optical system to image data;
- an image processing unit including a face region detecting unit and a photographing subject frequency information capturing unit, wherein the face region detecting unit is configured to detect a face region from the image data and obtain face region information indicating the detected face region, and wherein the photographing subject frequency information capturing unit is configured to capture focus degree information indicating a degree of focus for each detected face region;
- a recording unit configured to record a file; and
- a control unit configured to control the first operation input unit, the photographing optical system, the image processing unit and the recording unit; and
- wherein the control unit obtains plural image data with different focal positions by controlling the focal position of the photographing optical system in response to the photographing instruction, obtains the face region information and the focus degree information for each image data, and stores the plural image data, the face region information and the focus degree information in the recording unit as a single file; and
- wherein the control unit extracts representative image data having the highest focus degree among the plural image data stored in the single file, and stores the representative image data as a file, which is different from the single file, in the recording unit; and
- wherein the imaging device further comprises a display configured to display image data, and wherein the image sensing element is further configured to convert an optical image of a photographing subject received from the photographing optical system to displaying image data to be displayed in the display, wherein the face region detecting unit is configured to obtain the face region information from the displaying image data, and wherein the photographing subject frequency information capturing unit is configured to obtain the focus degree information for the detected face region of the displaying image data, and wherein the control data determines a range of the focal position for the photographing optical system based on the face region information and the focus degree information of the displaying image data, and shifts a focal position of the photographing optical system based on the determined range.

6. The imaging device as claimed in claim 5, wherein the file which is different from the single file is a JPEG format file.

7. The imaging device as claimed in claim 1, wherein a file which is different from the single file is a JPEG format file.

* * * * *